(12) United States Patent
Wirola et al.

(10) Patent No.: US 9,913,241 B2
(45) Date of Patent: Mar. 6, 2018

(54) METHOD AND APPARATUS FOR CLASSIFYING ACCESS POINTS IN A RADIO MAP

(71) Applicant: HERE Global B.V., Veldhoven (NL)

(72) Inventors: Lauri Wirola, Tampere (FI); Laura Wirola, Tampere (FI); Jari Syrjarinne, Tampere (FI); Mikko Blomqvist, Lempäälä (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/905,410

(22) PCT Filed: Jul. 16, 2014

(86) PCT No.: PCT/EP2014/065196
§ 371 (c)(1),
(2) Date: Jan. 15, 2016

(87) PCT Pub. No.: WO2015/007757
PCT Pub. Date: Jan. 22, 2015

(65) Prior Publication Data
US 2016/0374046 A1 Dec. 22, 2016

(30) Foreign Application Priority Data
Jul. 18, 2013 (GB) .................................. 1312820.2

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0236* (2013.01); *G01S 5/0252* (2013.01);
(Continued)

(58) Field of Classification Search
CPC ... H04W 64/003; H04W 16/20; H04W 88/08; G01S 5/0236; G01S 5/0252
(Continued)

(56) References Cited

U.S. PATENT DOCUMENTS 8,385,943 B1 * 2/2013 Han ...................... H04W 4/028
455/404.2
8,660,577 B2 * 2/2014 Ledlie ................... G01S 5/0252
370/338
(Continued)

FOREIGN PATENT DOCUMENTS

CN 102741701 A 10/2012
WO WO2011067466 6/2011

OTHER PUBLICATIONS

Arya et al., Hierarchical Clustering Technique for Radio Map Compression in Location Fingerprinting Systems, May 16-19, 2010, IEEE Vehicular Technology Conference.
(Continued)

*Primary Examiner* — Marceau Milord
(74) *Attorney, Agent, or Firm* — Lempia Summerfield Katz LLC

(57) ABSTRACT

In accordance with an example embodiment of the present invention, an apparatus comprises a receiver configured to receive a first plurality of lists of access points, at least one processor configured to determine a first access point which is comprised in a highest number of lists in the plurality of access points, the at least one processor further configured to determine a second access point which is comprised in a highest number of lists in a second plurality of lists, wherein the second plurality of lists is comprised of lists of access points from the first plurality of lists which do not comprise
(Continued)

the first access point, and the at least one processor further configured to set a significance flag for the first access point and the second access point.

7 Claims, 5 Drawing Sheets

(51) Int. Cl.
*G01S 5/02* (2010.01)
*H04W 16/20* (2009.01)
*H04W 88/08* (2009.01)

(52) U.S. Cl.
CPC ........... *H04W 16/20* (2013.01); *H04W 64/00* (2013.01); *H04W 88/08* (2013.01)

(58) Field of Classification Search
USPC .............................. 455/456.1, 509, 436, 444
See application file for complete search history.

(56) References Cited

U.S. PATENT DOCUMENTS

| | | | | |
|---|---|---|---|---|
| 8,816,908 | B2* | 8/2014 | Wirola | G01S 5/0252 342/385 |
| 9,288,632 | B2* | 3/2016 | Yang | G01S 5/0252 |
| 2007/0097939 | A1* | 5/2007 | Nylander | H04L 61/1511 370/338 |
| 2007/0133487 | A1* | 6/2007 | Wang | G01S 5/0252 370/338 |
| 2011/0286437 | A1* | 11/2011 | Austin | H04W 4/02 370/338 |
| 2012/0149415 | A1* | 6/2012 | Valaee | H04W 64/00 455/507 |
| 2012/0329479 | A1* | 12/2012 | Wirola | G01S 5/0236 455/456.1 |
| 2013/0035109 | A1* | 2/2013 | Tsruya | G01S 5/0252 455/456.1 |
| 2013/0172020 | A1* | 7/2013 | Aweya | G01S 5/0252 455/457 |
| 2013/0195314 | A1* | 8/2013 | Wirola | G01C 21/20 382/103 |
| 2014/0011518 | A1* | 1/2014 | Valaee | G01S 5/0252 455/456.1 |
| 2014/0094189 | A1* | 4/2014 | Reshef | H04W 64/00 455/456.2 |
| 2014/0335893 | A1* | 11/2014 | Ronen | G01S 5/0252 455/456.1 |
| 2015/0133148 | A1* | 5/2015 | Yang | G06F 17/30289 455/456.1 |
| 2015/0230100 | A1* | 8/2015 | Atia | H04W 16/18 370/252 |

OTHER PUBLICATIONS

Arya et al., Performance Analysis of Outdoor Localization Systems based on RSS Fingerprinting, Sep. 7, 2009, pp. 378-382, 6th International Symposim on IEEE.
Arya et al., Radio Database Compression for Accurate Energy-Efficient Localization in Fingerprinting Systems, Jun. 1, 2013, vol. 25, No. 6, IEEE Transactions on Knowledge and Data Engineering.
Feng et al., Compressive Sensing Based Positioning Using RSS of WLAN Access Points, Mar. 14, 2010, IEEE.
Gallagher et al., Database Updating Through User Feedback in Fingerprint-Based Wi-Fi Location Systems, Oct. 14, 2010, IEEE.
International Search Report and Written Opinion cited in PCT/EP2014/065196, dated Jan. 9, 2015.
Laitinen et al., Access Point Significance Measures in WLAN-based Location, Mar. 1, 2012, 9th Workshop on Positioning Navigation and Communication.
Shanwu et al., A Greedy WLAN-Based Localization Method Based on Location Fingerprint Database, Apr. 15, 2013, vol. 7, No. 7, International Journal of Digital Content Technology and It's Applications.
Wirola et al., Bandwidth and Storage Reduction of Radio Maps for Offline WLAN Positioning, Oct. 28, 2013, International Conference on Indoor Positioning and Indoor Navigation.
Chinese Office Action for related Chinese Application No. 201480040765.6 dated Dec. 28, 2016, with English Translation.
European Office Action for related European Application No. 14 739 173.4 dated Aug. 9, 2017.

* cited by examiner

METHOD AND APPARATUS FOR CLASSIFYING ACCESS POINTS IN A RADIO MAP

This application is filed under 35 U.S.C. 371 claiming benefit of PCT Application No. PCT/EP2014/065196, filed on Jul. 16, 2014, which claims the benefit of GB 1312820.2, filed on Jul. 18, 2013, the contents of each of which are incorporated herein by reference.

TECHNICAL FIELD

The present application relates generally to classifying access points in a radio map.

BACKGROUND

Modern global cellular and non-cellular positioning technologies are based on generating large global databases containing information on cellular and non-cellular signals. The information may originate entirely or partially from users of these positioning technologies. This approach may also be referred to as "crowd-sourcing".

Information provided by users may be in the form of "fingerprints", which contain a location that is estimated based on, for example, received satellite signals of a global navigation satellite system, GNSS, and measurements taken from one or more radio interfaces for signals of a cellular and/or non-cellular terrestrial system. In the case of measurements on cellular signals, the results of the measurements may contain a global and/or local identification of the cellular network cells observed, their signal strengths and/or path losses and/or timing measurements like timing advance, TA, or round-trip time. For measurements on wireless local area network, WLAN, signals, as an example of signals of a non-cellular system, the results of the measurements may contain at least one of a basic service set identification, BSSID, like the medium access control, MAC, address of observed access points, APs, the service set identifier, SSID, of the access points, and the signal strengths of received signals. A received signal strength indication, RSSI, or physical reception level may be expressed in dBm units with a reference value of 1 mW, for example.

Such data may then be transferred to a server or cloud, where the data may be collected and where further models may be generated based on the data for positioning purposes. Such further models can be coverage area estimates, communication node positions and/or radio channel models, with base stations of cellular communication networks and access points of WLANs being exemplary communication nodes. In the end, these refined models, also known as radio maps, RM, may be used for estimating the position of mobile terminals.

Fingerprints do not necessarily have to comprise a GNSS based position. They may also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points and the position of the unknown access points can be learned through these self-positioned fingerprints. Finally, more data can be learned of previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY

Various aspects of examples of the invention are set out in the claims.

According to a first aspect of the present invention, an apparatus comprises a receiver configured to receive a first plurality of lists of access points, at least one processor configured to determine a first access point which is common to a highest number of lists in the plurality of access points, the at least one processor further configured to remove lists comprising the first access point from the first plurality of lists to generate a second plurality of lists, the at least one processor further configured to determine a second access point which is common to a highest number of lists in the second plurality of lists, and the at least one processor further configured to determine to use at least one of the first access point and the second access point in generating a partial radio map.

According to a second aspect of the present invention, a method comprises receiving a first plurality of lists of access points, determining a first access point which is common to a highest number of lists in the first plurality of lists, removing lists comprising the first access point from the first plurality of lists to generate a second plurality of lists, determining a second access point which is common to a highest number of lists in the second plurality of lists, and determining to use at least one of the first access point and the second access point in generating a partial radio map.

According to a third aspect of the present invention, a method comprises receiving a list of access points, determining whether a significance flag is set for at least one access point in the list, and determining to use the at least one access point in generating a partial radio map based at least in part on the significance flag being set.

According to a fourth aspect of the present invention, a method comprises receiving a list of access points detected at a location, determining whether at least one access point in the list has a significance flag set, and setting the significance flag for the at least one access point in the list based at least in part on the significance flag not being set for any access point in the list.

According to further aspects of the present invention, computer programs are provided that are configured to cause methods in accordance with the second, third and fourth aspects to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
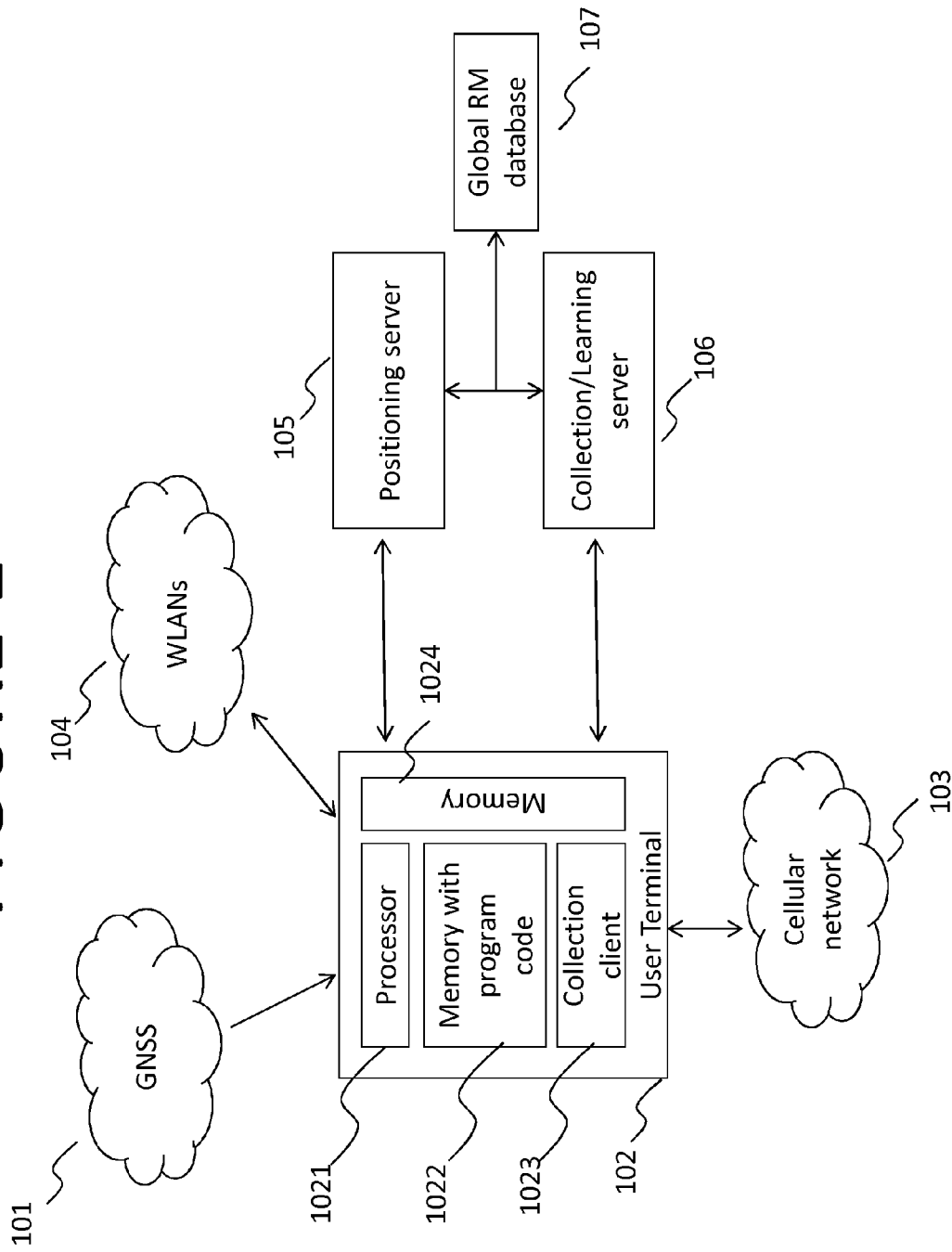
FIG. 1 shows an example architecture of a positioning system.

Positioning systems may function in two modes. A first mode is a terminal-assisted mode, in which a terminal performs measurements of cellular and/or non-cellular air interface signals and provides results of the measurements to a positioning server hosting a global cellular and/or non-cellular RM database. The server then provides a position estimate back to the terminal. This methodology is called online positioning and requires the terminal to have data connectivity whenever positioning service is needed.

A second mode is a terminal-based mode, an offline positioning technique, in which a terminal has a local copy of a RM, called a partial RM. This partial RM is a subset of the global RM in form of WLAN RM offline files, for example. These files may be in the form of a database or any other form that is readable by a computer. There may be multiple such files, since it may be advantageous not to have a single global file, but several smaller ones so that the terminal may only download partial RM for a specific area, for example, a country or a city where a need for positioning is anticipated. This subset can also be pre-installed on the terminal. In at least one of the downloaded and pre-installed case, data in the subset may need to be refreshed at some point. Offline positioning techniques do not require the terminal to have data connectivity whenever positioning service is needed.

Offline positioning may be advantageous from a service perspective because it helps reduce load on positioning servers. Also, since the terminals are capable of positioning themselves without contacting a positioning server, the terminals may remain location aware all the time. Additionally, time-to-first-fix may be very short, since the device does not need to contact the server.

WLAN RM offline files can be very large in size. As an example, in an urban/suburban area covering roughly 10×10 km, there can be more than 10 million APs. This results in an average density of one AP every 10 m$^2$ or 400,000 APs per 2×2 km tile. Transferring location information for each of these APs from a server to a terminal consumes a lot of server resources, network bandwidth, storage space in the terminal and it can also be quite expensive to the consumer in the form of data charges. Thus, it is desirable to reduce the number of APs in a partial RM and resultantly have smaller size WLAN RM offline files while still maintaining an acceptable level of accuracy and availability in offline positioning.

Embodiments of the present invention relate to reducing a number of APs in a partial RM. Positioning requests or fingerprints pertaining to locations with high AP density are likely to include a common large set of APs. In many cases, it may be sufficient to choose only a subset of these APs, to be able to serve a positioning request pertaining to the high AP density area. This subset of APs may be called significant APs. In at least some embodiments, significant APs have a larger impact on accuracy and availability of positioning than non-significant APs. While reducing the number of APs from a global RM to yield a partial RM, ensuring inclusion of significant APs in a partial RM is likely to result in higher accuracy and availability of offline positioning compared to partial RMs with the same number of APs but not including the significant APs. Availability of a positioning system is defined as the ratio of the number of successful positioning events to the total number of positioning requests. It can be appreciated that availability is an important metric affecting user experience and can be heavily affected if the number of APs in a radio map is reduced.

FIG. 1 shows an example architecture of a positioning system. The positioning system of FIG. 1 comprises a GNSS 101, a user terminal 102, a cellular network 103, WLAN systems 104, a positioning server 105, a collection/learning server 106 and a global RM database 107. Positioning server 105 and collection/learning server 106 may be co-located in a single site or apparatus, or alternatively they may be distinct in the sense that positioning server 105 is external to collection/learning server 106 and collection/learning server 106 is external to positioning server 105. Global RM database may be a standalone node, or it may be comprised in collection/learning server 106 and/or positioning server 105. The user terminal 102 may receive its GNSS based position from the GNSS 101. The GNSS could be GPS, GLONASS or any other satellite based navigation system. The user terminal may also receive radio signals from the cellular network 103. The cellular communication network 103 could be based on any kind of cellular system, for instance a GSM system, a 3rd Generation Partnership Project, 3GPP, based cellular system like a WCDMA system or a time division synchronous CDMA, TD-SCDMA, system, e.g. supporting high speed packet access, HSPA, a 3GPP2 system like a CDMA2000 system, a long term evolution, LTE, or LTE-Advanced system, or any other type of cellular system, like a WiMAX system. Cellular communication network 103 comprises a plurality of base stations or base transceiver stations as communication nodes. Furthermore, user terminal 102 may also receive signals from WLANs 104. WLANs 104 comprise at least one access point as a communication node. WLANs 104 may be based upon the IEEE 802.11 standards, for example.

The user terminal 102 comprises a processor 1021, and linked to the processor, a memory 1022. Memory 1022 stores computer program code in order to cause the user terminal 102 to perform desired actions. Processor 1021 is configured to execute computer program code stored in memory 1022. The user terminal further comprises memory 1024 to store additional data such as, for example, partial RMs. The user terminal may further include at least one antenna in communication with at least one transmitter and at least one receiver to enable communication with the GNSS 101, cellular network 103, WLAN 104, positioning server 105 and collection/learning server 106. The mobile terminal processor 1021 may be configured to provide signals to and receive signals from the at least one transmitter and the at least one receiver, respectively.

Although not shown, the user terminal 102 may also include one or more other means for sharing and/or obtaining data. For example, the apparatus may comprise a short-range radio frequency, RF, transceiver and/or interrogator so data may be shared with and/or obtained from electronic devices in accordance with RF techniques. The user terminal may comprise other short-range transceivers, such as, for example, an infrared, IR, transceiver, a Bluetooth™ BT, transceiver operating using Bluetooth™ brand wireless technology developed by the Bluetooth™ Special Interest Group, a wireless universal serial bus, USB, transceiver and/or the like. The Bluetooth™ transceiver may be capable of operating according to low power or ultra-low power Bluetooth™ technology, for example, Bluetooth low energy, radio standards. In this regard, the user terminal 102 and, in particular, the short-range transceiver may be capable of transmitting data to and/or receiving data from electronic devices within a proximity of the apparatus, such as within 10 meters, for example. The apparatus may be capable of transmitting and/or receiving data from electronic devices according to various wireless networking techniques, including 6LoWpan, Wi-Fi, Wi-Fi low power, IEEE 802.15 techniques, IEEE 802.16 techniques, and/or the like.

The user terminal further comprises a collection client 1023. Collection client 1023 may comprise, for example, a software module stored in memory 1022, or in another memory comprised in user terminal 102. The collection client 1023 may be configured to collect information comprising at least one of the following to be sent to the collection/learning server 106:

An estimate of the user terminal's location based on, for example, received satellite signals of the GNSS 101

Measurements taken from signals of the cellular network 103.

Results of scanning of WLAN systems 104.

Results of scanning of other short range radio signals.

The collection/learning server 106 receives this information and based on it, builds a database of AP locations and coverage areas of cellular base stations and APs, such as for example WLAN APs. Such a database may be called a global RM database 107 since the RMs stored in this database may not be specific to a country or a city. Rather, they may be global in nature. In some embodiments, collection/learning server 106 is configured to build a database of AP locations that does not comprise information on coverage areas of cellular base stations.

Once a reliable global RM database 107 is built, the positioning server 105 may serve online positioning requests from user terminals. A user terminal may take measurements of signals from cellular networks and/or perform WLAN scans and send them to the positioning server 105. The positioning server may refer to the global RM database and based at least in part upon the information provided by the user terminal, provide an estimate of the user terminal position.

If a data connection between the positioning server and a user terminal is unavailable or is undesirable, the terminal may rely on offline positioning. For terminal based offline positioning to work, a partial RM or a subset of the global RM in form of RM offline files, such as for example WLAN offline files, may be stored in the memory 1024 of the user terminal. With a partial RM pertaining to the area in which a user terminal is presently located stored in a memory of the user terminal, the user terminal may scan the WLANs and/or signals from cellular networks at its location and after consulting a partial RM stored in its memory, find its position without sending a request to a positioning server. It should be noted that partial RMs may be based upon access points of short range wireless systems other than WLAN systems and a user terminal may scan for signals from at least one of these other short range wireless systems to estimate its position.

Figure 2:
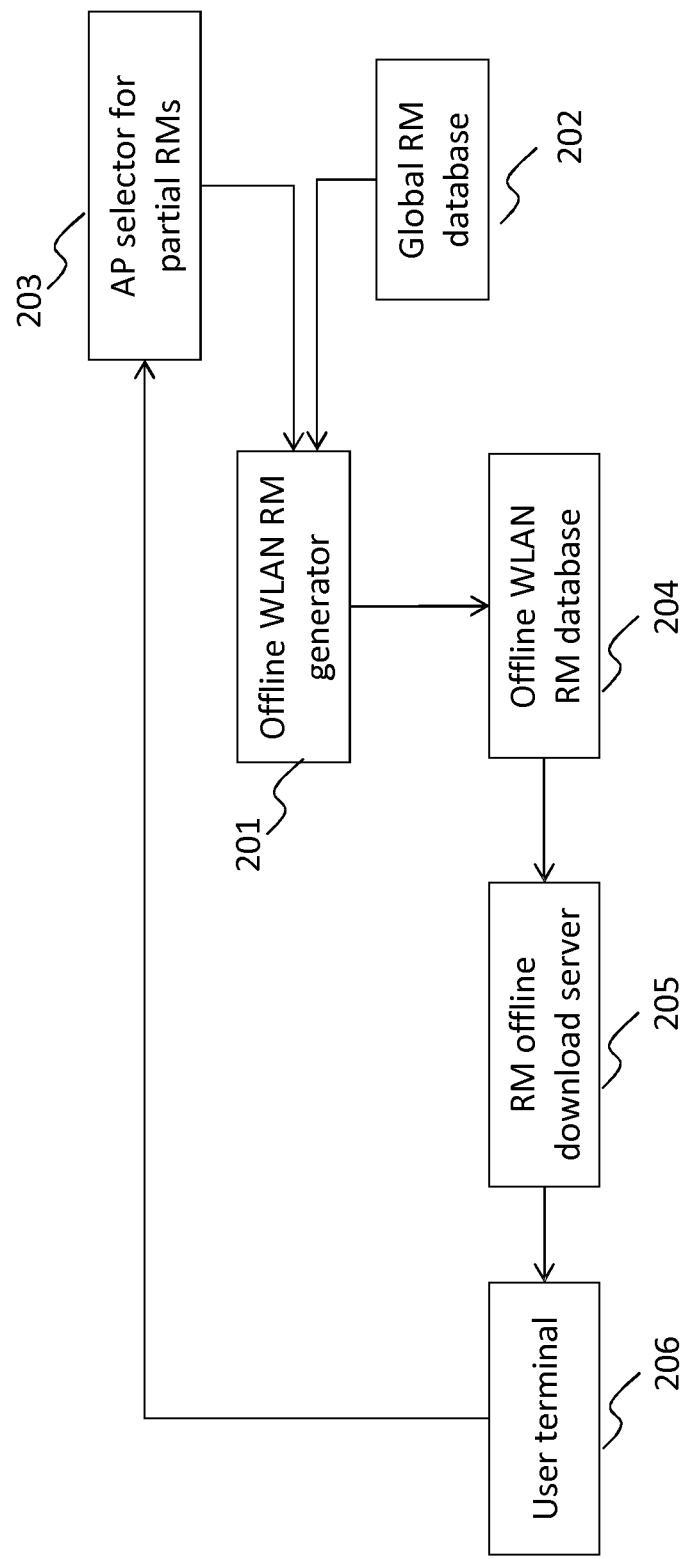
FIG. 2 shows an example system for generating and distributing partial RMs for offline usage in user terminals.

FIG. 2 shows an exemplary system for generating and distributing partial RMs for offline usage in user terminals. In accordance with an embodiment of the present invention, the offline WLAN RM generator, OW-RMG, 201 takes as inputs a global RM from the global database 202 and a list of WLAN APs to be included in a partial RM from the AP selector for partial RMs 203. As discussed earlier, it is not desirable to include all APs in offline RMs to be stored on a user terminal and the AP selector for partial RMs 203 helps achieve this goal by identifying APs which are relevant to the performance of partial RMs. The selection of APs by the AP selector for partial RMs 203 may be based at least in part on the inputs provided by the user terminal 206. The OW-RMG 201 may further refine the list of APs received from the selector 203 based upon a set of at least one criterion. The OW-RMG 201 generates partial RMs based upon these inputs and transfers them for storage to the offline WLAN RM database 204. The partial RMs needed by a user terminal 206 are then transferred by the offline WLAN RM database 204 to the RM offline download server 205. In another embodiment of the invention, the offline WLAN RM database 204 may be absent and a partial RM file may be transmitted directly from the OW-RMG 201 to the RM offline download server 205. From the download server, they may be downloaded by the user terminal 206 or any other user terminal. The user terminal may include at least one antenna in communication with at least one transmitter and at least one receiver to enable communication with the download server. Similarly, the download server may include at least one antenna in communication with at least one transmitter and at least one receiver to enable communication with the user terminal. The download server may further include a processor configured to provide signals to and receive signals from the transmitter and receiver, respectively.

It is highly desirable to have partial RMs which result in high accuracy and availability of offline positioning and yet are based upon as small number of APs as possible. In accordance with embodiments of the present invention, this can be achieved if significant APs are included in the partial RM. These significant APs can be identified based upon positioning requests or fingerprints in the server.

Global RM database 202, AP selector for partial RMs 203, Offline WLAN RM generator 201, Offline WLAN RM database 204 and RM offline download server 205 may be implemented as standalone nodes in a network, or alternatively at least two and optionally even all of them may be implemented as functions in a single physical server.

Figure 3:
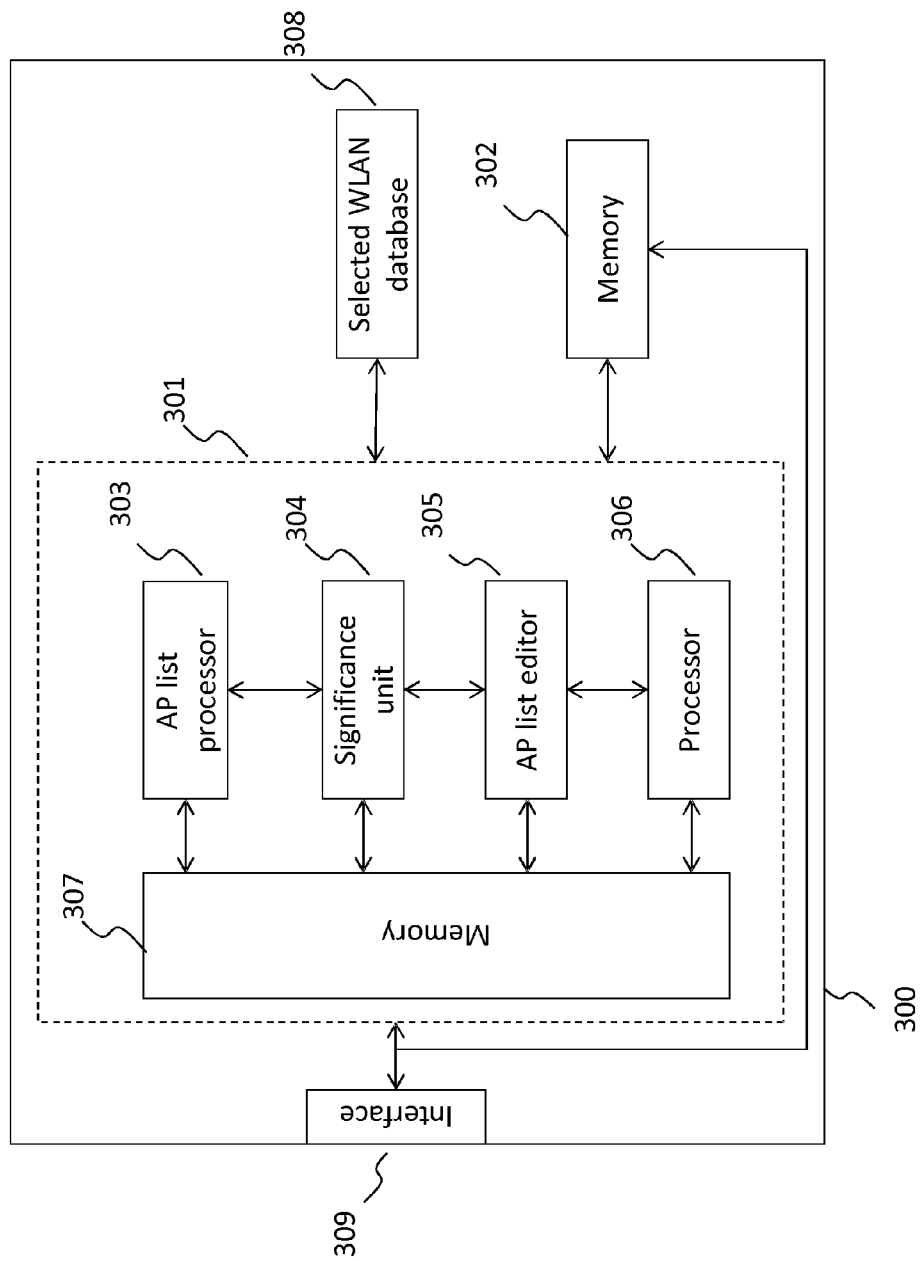
FIG. 3 shows an apparatus embodying a process for determining significant APs according to an example embodiment of the invention.

FIG. 3 shows an example apparatus embodying a process for determining significant APs according to an example embodiment of the invention. As an example, FIG. 3 may represent the AP selector for partial RMs 203 of FIG. 2. Apparatus 300 comprises processors 301, 303, 304, 305, 306 and, linked to these processors, a memory 307. The processors 301, 303, 304, 305, 306 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 3 as single processors, in some embodiments the processors 303, 304, 305, 306 may comprise a plurality of processors or processing cores. Similarly, processors 303, 304, 305, 306 may be embodied within one processor 301. In some embodiments, at least one of processors 303, 304, 305 and 306 are implemented at least in part in software, which software may be run on processor 301. Memory 307 stores computer program code for supporting determining significant APs for inclusion in a partial RM. Processors 301, 303, 304, 305, 306 are configured to execute computer program code stored in memory 307 in order to cause the apparatus to perform desired actions. Apparatus 300 further comprises memory 302. Memory 302 may be used, at least in part, to store input data needed for operations of the apparatus 300 or output data resulting from operation of the apparatus 300. Apparatus 300 could be a server or any other suitable device. Apparatus 300 could equally be a module, like a chip, circuitry on a chip or a plug-in board, for a server or for any other device. Optionally, apparatus 300 could comprise various other components, such as for example at least one of a user interface, a further memory and a further processor. Memory 302 and memory 307 may be distinct memories, or alternatively memory 307 may be comprised in memory 302, or memory 302 may be comprised in memory 307.

Interface 309, which may be a data interface, may receive a plurality of lists of APs that at least one user terminal has detected at a location. A list of APs may comprise just one AP or it may comprise more than one APs. The location may comprise an area surrounding a geographical position, for example. A list of APs may comprise a list of at least one AP identity. An AP identity may comprise a service set identification, SSID, and/or a basic service set identifier, BSSID. In some embodiments, the plurality of lists comprise identities of base stations, such as for example cellular base stations. The plurality of lists may be part of one or more positioning requests comprising WLAN scan results of user terminals or they may be part of one or more fingerprints received from a plurality of user terminals, for example. One or more lists comprising the plurality of lists may be received at the interface 309 at different times or they may be received simultaneously. The plurality of lists may be stored in memory 302 or in memory 307, for example. One or more lists comprising the plurality of lists may be stored in memory 302 and/or memory 307 at different times or they may be stored simultaneously, for example. The plurality of lists may be sent by the interface 309 to the AP list processor 303 or the AP list processor 303 may retrieve the plurality of lists from memory 302 and/or memory 307.

The AP list processor 303 may determine a number of lists, in which each AP comprised in the plurality of lists of APs, is present. An AP which is present in a highest number of lists may be called a significant AP. For example, consider the following three lists of APs, R1, R2, R3, that are received at the AP list processor 303:

R1=(AP1, AP3, AP6, AP7)
R2=(AP2, AP3, AP4)
R3=(AP1, AP3, AP5, AP6)

Each of these lists may be comprised in a different positioning request and together, these lists comprise seven APs, AP1-AP7. In another embodiment of the invention, some or all of these lists may be comprised in one or more fingerprints.

Among the seven APs that are comprised in the three AP lists, AP3 appears in each list and as such is an AP which is common to a highest number of lists. Being comprised in a highest number of lists may comprise being common to a highest number of lists. The number of lists to which each AP is common is shown in Table 1.

TABLE 1

Number of lists to which each AP is common

| | AP | | | | | | |
|---|---|---|---|---|---|---|---|
| | AP1 | AP2 | AP3 | AP4 | AP5 | AP6 | AP7 |
| No. of Lists | 2 | 1 | 3 | 1 | 1 | 2 | 1 |

AP3 is identified as a significant AP by the AP list processor 303. Since AP3 appears in all three lists, it is enough to select only AP3 to serve the three positioning requests R1, R2 and R3. Similarly, instead of forming a RM with all seven APs, AP1-AP7, a partial RM may be formed with only one AP, AP3, to sufficiently serve all three positioning requests. Hence, by using significance of APs, a size of a partial RM may be reduced, in this particular embodiment, from seven APs to just one AP.

The AP list processor 303 sends an identity of AP3 to the significance unit 304. The significance unit 304 sets a flag associated with AP3 to indicate that AP3 is a significant AP. The flag may be a memory location and may be comprised in memory 302 or in memory 307, for example. The significance flag may be a binary flag which may be set to either 0 or 1, indicating whether an AP is significant or not, for example.

The AP list editor 305 determines significant AP(s) by reading the significance flag(s), for example. The AP list editor may determine, based upon a value of a significance flag associated with AP3, that AP3 is a significant AP. Using knowledge of significant APs, the AP list editor may remove the lists comprising significant APs from the plurality of lists, to generate a smaller set of lists. For example, in another embodiment of the invention, if the following four lists of APs were received at the AP list processor,

R1=(AP1, AP3, AP6, AP7)
R2=(AP2, AP3, AP4)
R3=(AP1, AP3, AP5, AP6)
R4=(AP7)

then, a table listing the number of lists to which each AP is common would look like the following:

TABLE 2

Number of lists to which each AP is common

| | AP | | | | | | |
|---|---|---|---|---|---|---|---|
| | AP1 | AP2 | AP3 | AP4 | AP5 | AP6 | AP7 |
| No. of Lists | 2 | 1 | 3 | 1 | 1 | 2 | 2 |

As already described, the AP list processor 303 will determine that AP3 is a significant AP and the significance unit 304 will set the significance flag for AP3. Based upon the significance flag for AP3 being set, the AP list editor 305 will remove R1, R2, and R3 from the list of APs, since R1, R2 and R3 comprise a significant AP, AP3. Only R4 will remain. The AP list processor 303 will now analyse R4, the only remaining list and will determine that R7, the only AP in the list does not have its significance flag set. The AP list processor 303 will communicate an identity of AP7 to the significance unit 304. This communication may take effect by the AP list processor writing a memory location in memory 302 or memory 307, for example, and the significance unit reading the memory location. Or, the AP list processor 303 may communicate an identity of AP7 directly to the significance unit 304 via a data bus, such as one connecting the AP list processor 303 and significance unit 304, for example. The significance unit sets a significance flag of AP7. The AP list editor then determines that there are no more lists to be processed. In some embodiments, lists are not removed as such in the sense of being deleted or erased, rather the lists concerned are merely not used in subsequent processing.

The AP list editor may check for any pending AP lists to process periodically or based upon a trigger, for example. The trigger may be received from the significance unit after a significance flag is set, for example.

In another embodiment of the invention, the plurality of lists of access points received by the AP list processor 303 comprises only one list of access points. If none of the APs comprised in the list has their significance flag set, the AP list processor 303 may identify to the significance unit 304, one or more APs comprised in the list as significant APs. However, in order to reduce a size of a partial RM, it may be advantageous to identify only one or only a subset of APs comprised in the list to the significance unit and thereby set the significance flag for only one or for only a subset of APs comprised in the list, for example. An AP for which a significance flag is to be set may be determined based at least in part on the number of positioning requests comprising the AP.

The Selected WLAN Database, SWDB, 308 may store APs for which the significance flag is set. The SWDB 308 may comprise a memory.

The significance data of an AP in SWDB 308 may be divided into time periods of desired length, such as for example daily, weekly or monthly significance data. The daily, monthly or weekly significance data is saved for a desired period of time, for example, for the previous six months. The SWDB may be configured to store significance data for all APs for this desired period of time.

The advantage of saving significance data in time periods is that it facilitates detecting changes in RM. For example, if there are changes in the significance flag between months, the AP most likely has been moved or is no longer in use. Similarly new APs may appear.

A RM generator, such as OW-RMG 201 of FIG. 2, may generate partial RMs using list of APs from the SWDB 308. Various criteria may be used to choose significant APs to be included in generation of partial RMs. For example, APs with significance flag set over certain period of time may be chosen. As an example, APs may be the ones with significance flag set over the previous 3 months, for example. Significance data of the selected APs should preferably be not too old. The limit may be that only APs that have significance flag set within the previous two, four or six months are considered, for example. This ensures that the old APs are not included into the partial RM. A RM generator, such as OW-RMG 201 of FIG. 2, may generate new partial RMs periodically, such as monthly or weekly or upon request. A RM generator may receive additional information needed for generation of partial RMs, such as AP locations, from other sources such as the global RM database 202, for example. In another embodiment of the invention, the SWDB 308 may store the locations of selected APs along with the AP identities and provide them to the OW-RMG 201.

In yet another embodiment of the invention, an AP may not be selected for inclusion in a partial RM if it may not be used for position calculation.

Note that other selection methods can also be utilized and the invention is not restricted to selection methods described herein.

In another embodiment of the invention, the SWDB 308 may be absent and an identity of APs with significance flag set may be provided directly to a RM generator, such as OW-RMG 201 of FIG. 2, from the processor 301. In another embodiment of the invention, a RM generator may read significance flags from memory 302 and memory 307, for example.

Figure 4:
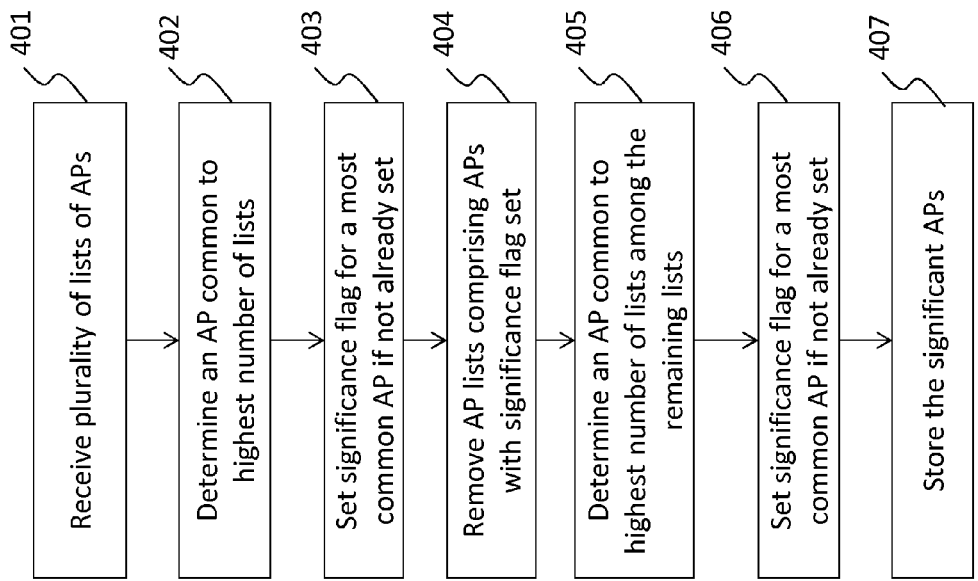
FIG. 4 is a flow diagram showing operations for determining significant APs in accordance with at least one embodiment of the invention.

FIG. 4 is a flow diagram showing operations of an AP selector for partial RMs, such as AP selector for partial RMs 203 of FIG. 2, according to an example embodiment of the invention. The method may be executed by an apparatus, such as for example apparatus 300 of FIG. 3. In step 401, an AP selector receives information comprising a plurality of lists of APs detected by one or more user terminals at a location. The location may comprise an area surrounding a geographical position, for example. This information may be in form of one or more fingerprints or one or more positioning requests comprising WLAN scan results, for example. The list may comprise just one AP or it may comprise more than one APs. In step 402, the lists of APs, or lists of AP identities, are extracted from the information received and the number of lists to which APs comprised in the plurality of lists are common, is determined. An AP which is common to a highest number of AP lists is identified as a significant AP. In some embodiments of the invention, in step 402, the selector may further determine whether there are APs in the list which need to be excluded as candidates for inclusion in a partial RM. Reasons due to which an AP in the list may not be a candidate for inclusion in a partial RM may be that the AP is not included in the global RM and as such would not be used for the position calculation. Yet another possible reason could be that the AP is an outlier. That is, it is located so far away from the other APs in the list that its inclusion in position determination will be meaningless. For example, if there are five APs in the list and one of them is location 1000 km away from the others, it may be excluded. Furthermore in step 402, an AP which is comprised in a highest number of lists is determined. This AP may be called a significant AP.

In step 403, an identity of a significant AP is received from step 402 and a value of its significance flag for is updated. The significance flag may be a memory location comprised in a memory, such as memory 302 or memory 307 for FIG. 3, for example. In step 404, AP lists not comprising APs with significance flag set are removed from the plurality of lists to result in a reduced list of APs. In step 405, the number of lists from the reduced list of APs, to which one or more APs comprised in the plurality of lists is common, is determined. Furthermore, an AP which is comprised in a highest number of lists from the reduced list is identified. In step 406, a significance flag is set for this identified AP. Finally in step 407, APs for which significance flag is set are stored for later use by, for example, offline WLAN RM generator.

In an example embodiment of the invention, steps 401-406 may be performed till at least one significant AP is comprised in each of the AP lists. In another example embodiment of the invention, steps 401-406 may be performed for a certain period of time, for example once monthly, before moving on to step 407. That is, the significance flags may be updated for a month and then it may be decided which APs are to be included in a partial RM. Similarly, other periods of time to assess significance of APs may be implemented.

Figure 5:
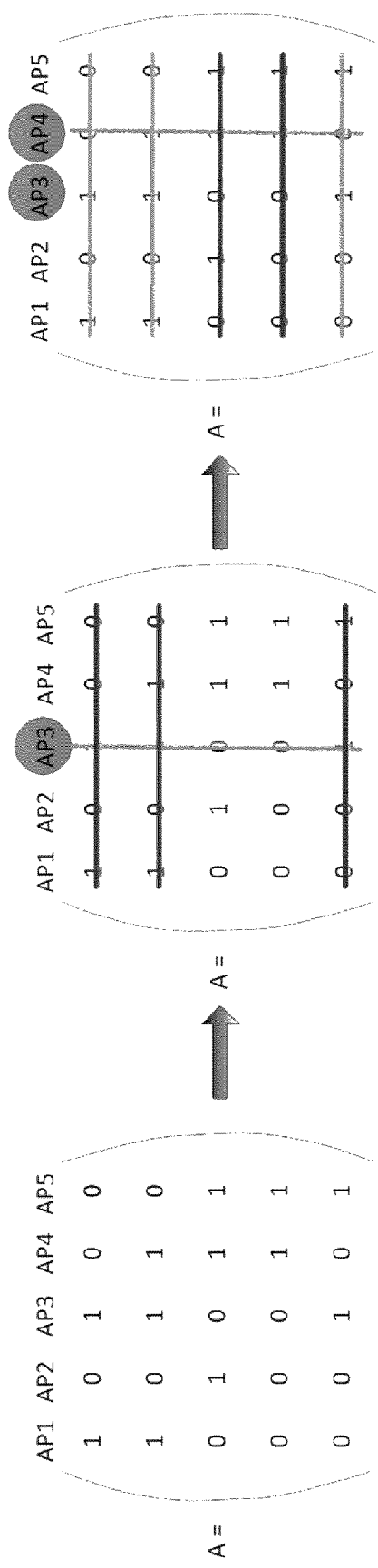
FIG. 5 demonstrates process for determination of significant APs in accordance with an example embodiment of the invention.

FIG. 5 demonstrates a process for determination of significant APs in accordance with an example embodiment of the invention. In the embodiment shown in FIG. 5, a plurality of lists of APs is received by an AP selector, comprising the following five lists of APs:

R1=(AP1, AP3)
R2=(AP1, AP3, AP4)
R3=(AP2, AP4, AP5)
R4=(AP4, AP5)
R5=(AP3, AP5)

These AP lists may be part of one or more positioning requests or they may be part of one or more fingerprints, for example. The AP lists may be analysed as they are received or they may be analysed in a batch mode, in which case all AP lists received over a period of time, say one month, may be analysed together, for example.

In order to identify significant APs, a matrix such as one shown in FIG. 5 may be constructed. In the matrices shown in FIG. 5, each row of a matrix represents an AP list and each column represents an AP. For example, element in row 4 and column 3 of the matrix represents presence or absence of AP3 in list R4. If this element of the matrix has a value 1, the AP is present in the AP list and if the value is 0, the AP is not present in the AP list. An AP that is observed in most requests may be identified by identifying a column with a largest column sum. Each of AP3, AP4 and AP5 are observed in three lists, and in the embodiment of the invention shown in FIG. 3, AP3 is randomly chosen as an AP which is common to a highest number of lists. In the matrix in the middle of the figure, all lists comprising AP3 (R1, R2 and R5) are removed. Next, an AP that is common to most lists among the remaining lists is chosen. Both AP4 and AP5 are observed in both of the remaining requests and AP4 is chosen.

In a practical implementation of this embodiment of the invention, once a memory has been allocated to store a matrix representing R1-R5, an additional memory allocation may not be needed to store a new matrix after some of the rows from the original matrix are removed. Instead, pointers to memory locations in the original memory allocation can be used to implement a new matrix.

Hence, five positioning requests with five APs can be served with just two APs (AP3 and AP4). Thus significance flag is set for these two APs and a partial RM comprising these two APs will be sufficient to serve R1-R5.

The above example is only an example method of identify a set of significant APs. There may be other mathematical algorithms such as those suitable for dimension reduction problems, which can be used to find a set of significant APs. At least one such algorithm is presented in SIAM J. Matrix Anal. Appl., vol. 21, No. 3, pp. 797-808, titled "On the optimality of the backward greedy algorithm for the subset selection problem", by Christophe Couvreur et al.

While using a reduced set of APs in a partial RM, a grid based mechanism may be used to achieve spatial AP density and spatial AP coverage similar to a global RM. This is achieved by mapping APs first to nodes of a grid. The selection of the APs is then done in every grid node separately. "Similar" spatial AP coverage means that the there are no empty spots in the offline RM in areas that had APs in original RM. Similar spatial density means that the offline RM has similar AP density as the original RM, in other words, the area with high AP density in the original RM will have high AP density also in the reduced RM, though smaller in absolute terms.

It may be advantageous to combine the grid based mechanism with significant APs. This way, one can ensure good spatial coverage and AP density while using less APs, at the cost of minor loss in positioning accuracy and availability. It may also be advantageous to combine grid based mechanism with significant APs and hot APs, wherein hot APs are APs that are comprised in past positioning requests. In an example embodiment of the invention, a partial RM may be generated by first mapping APs in an area to nodes of a grid, then first prioritizing significant APs for inclusion in the partial RM and thereafter prioritizing hot APs for inclusion in the partial RM.

If desired, the different functions discussed herein may be performed in a different order and/or concurrently with each other. Furthermore, if desired, one or more of the above-described functions may be optional or may be combined.

Without in any way limiting the scope, interpretation, or application of the claims appearing below, a technical effect of one or more of the example embodiments disclosed herein is reducing number of APs in RM with minimal loss in positioning accuracy and availability. Another technical effect of one or more of the example embodiments disclosed herein is to achieve a desired level of positioning accuracy and availability with minimum number of APs. Another technical effect of one or more of the example embodiments disclosed herein is to reduce the size of partial RM files.

Embodiments of the present invention may be implemented in software, hardware, application logic or a combination of software, hardware and application logic. The software, application logic and/or hardware may reside on memory 307, the processor 301 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a receiver configured to receive a first plurality of lists of access points;
   at least one processor configured to determine a first access point which is included in a highest number of lists in the first plurality of lists of access points;
   the at least one processor further configured to determine a second access point which is included in a highest number of lists in a second plurality of lists, wherein the second plurality of lists is comprised of lists of access points from the first plurality of lists which do not comprise the first access point; and the at least one processor further configured to set a significance flag for the first access point and the second access point.

2. The apparatus of claim 1, wherein the at least one processor is further configured to use the first access point, the second access point, or both the first access point and the second access point in generating a partial radio map.

3. The apparatus of claim 1, wherein the first plurality of lists of access points comprises access points that were detected within a predetermined period of time.

4. An apparatus, comprising:
a receiver configured to receive a list of access points;
at least one processor configured to determine whether a significance flag is set for at least one access point in the list of access points; and
the at least one processor further configured to determine to use the at least one access point in generating a partial radio map based at least in part on the significance flag being set and based on a grid based mechanism to achieve spatial access point density and spatial access point coverage similar to a global radio map.

5. The apparatus of claim 4, wherein the list of access points comprises access points that were detected within a predetermined period of time.

6. An apparatus, comprising:
a receiver configured to receive a list of access points detected at a location;
at least one processor configured to determine whether at least one access point in the list of access points has a significance flag set; and
the at least one processor further configured to set the significance flag for the at least one access point in the list of access points based at least in part on the significance flag not being set for any access point in the list, wherein the at least one processor is further configured to set the significance flag for the at least one access point based at least in part on a number of positioning requests comprising the at least one access point.

7. The apparatus of claim 6, wherein the list of access points comprises access points that were detected within a predetermined period of time.

* * * * *